C. T. SMITH.
STREET CLEANING APPARATUS FOR MELTING SNOW AND THE LIKE.
APPLICATION FILED SEPT. 15, 1914.
1,160,205.
Patented Nov. 16, 1915.
5 SHEETS—SHEET 1.
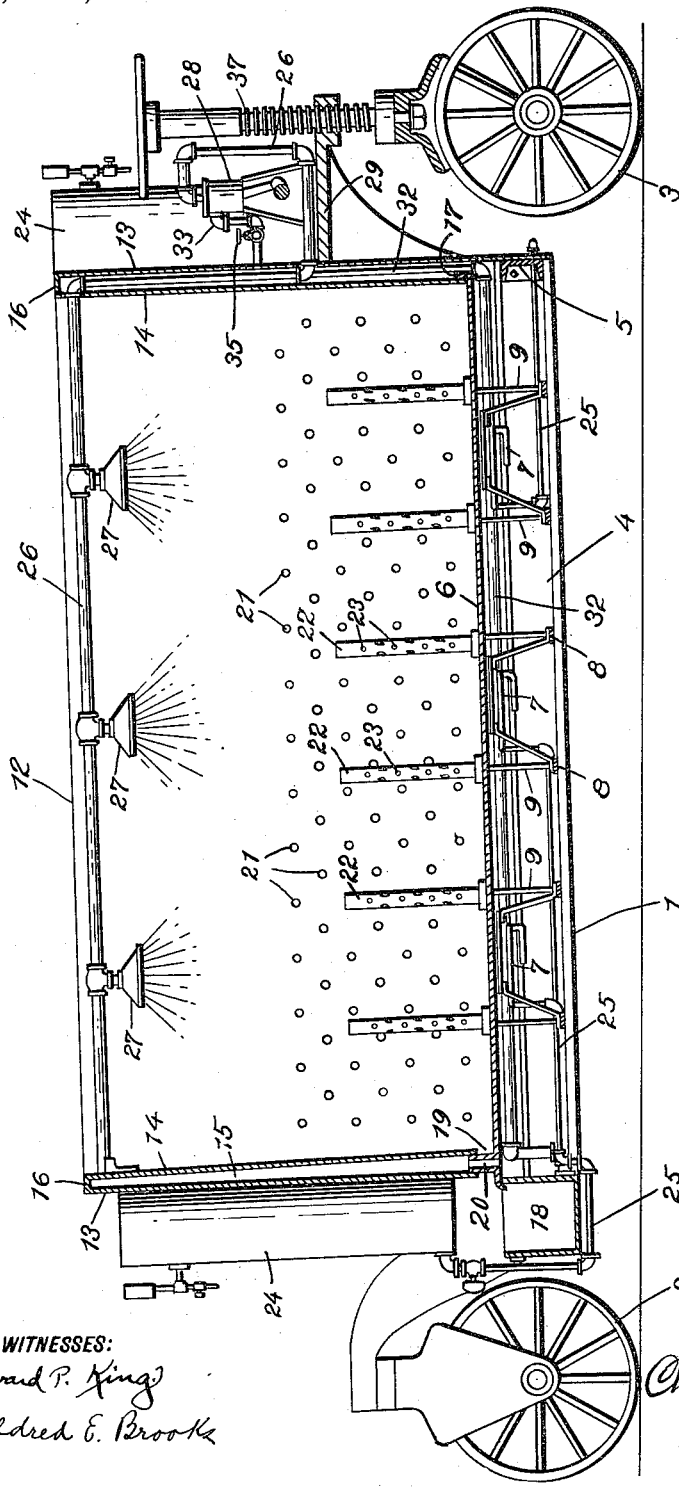
WITNESSES:
Howard P. King
Mildred E. Brooks
INVENTOR:
Charles T. Smith,
BY
Russell W. Everett,
ATTORNEY.

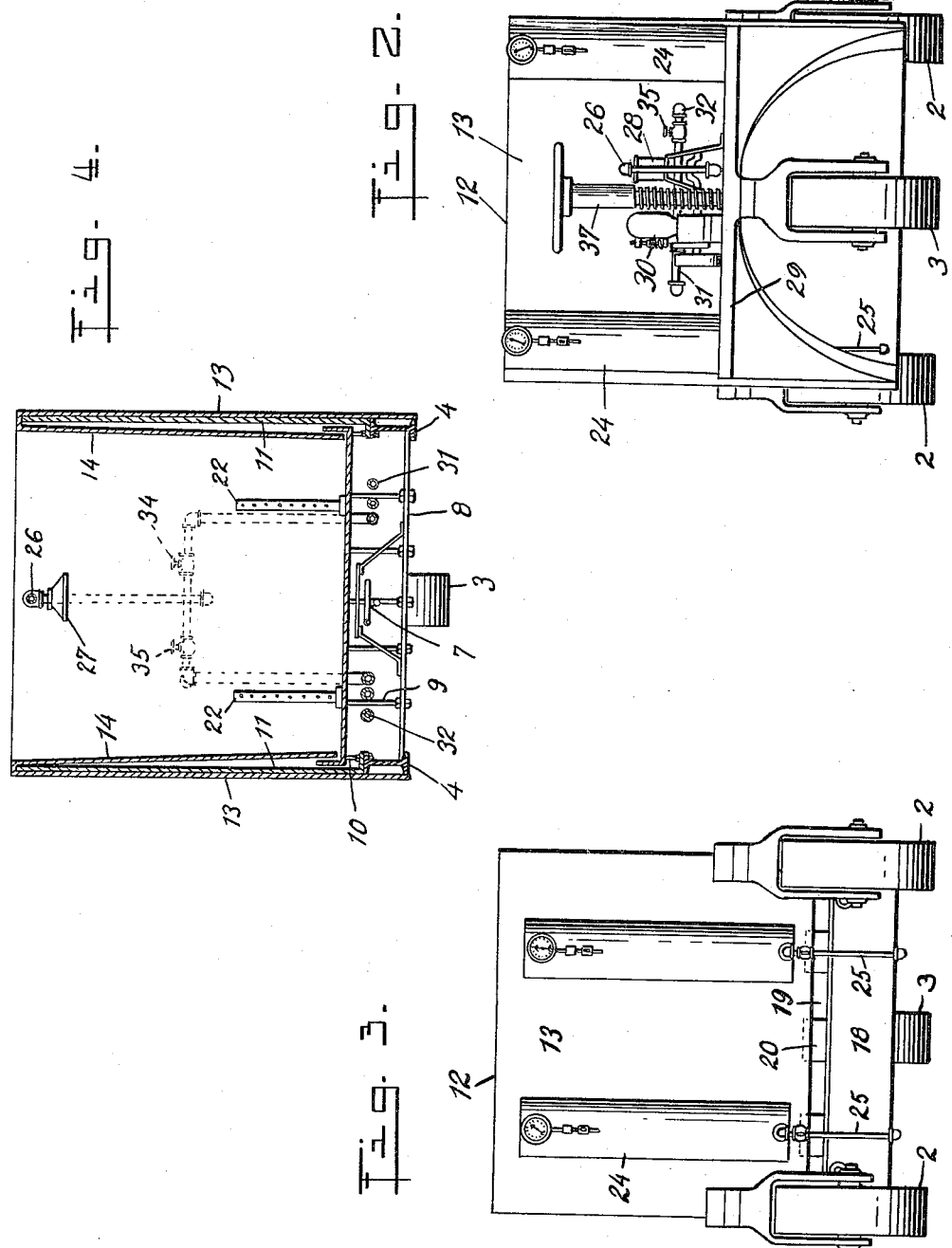

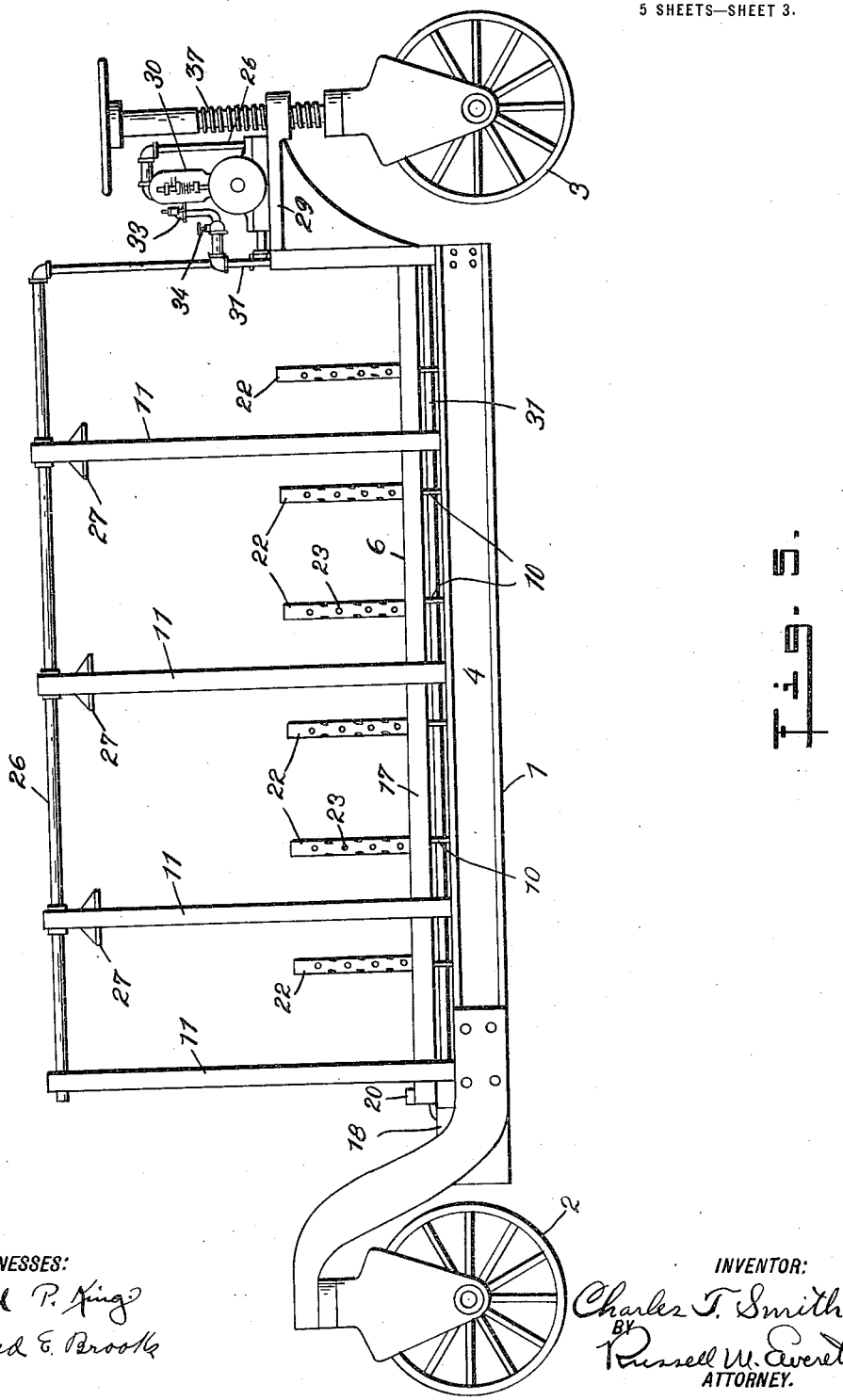

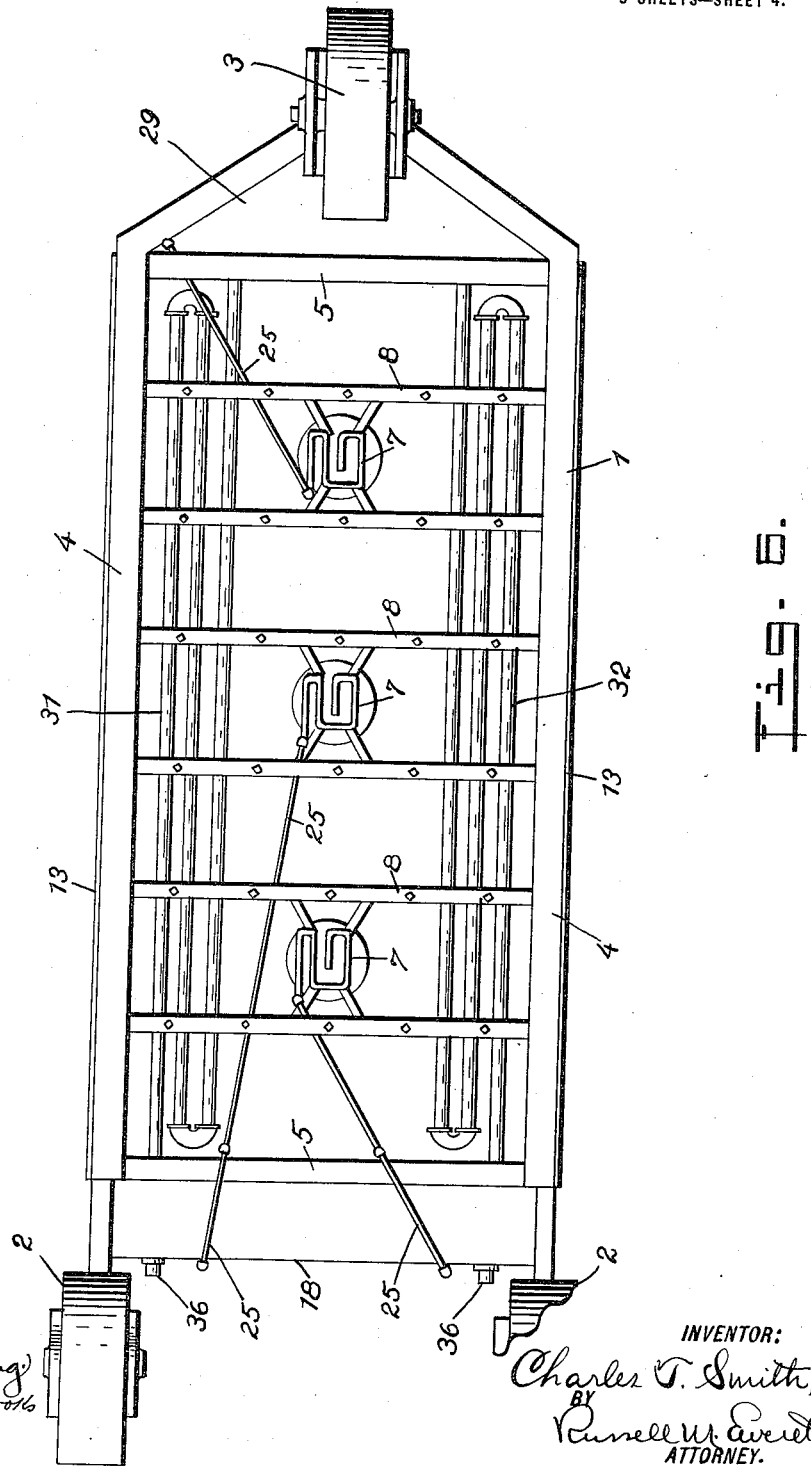

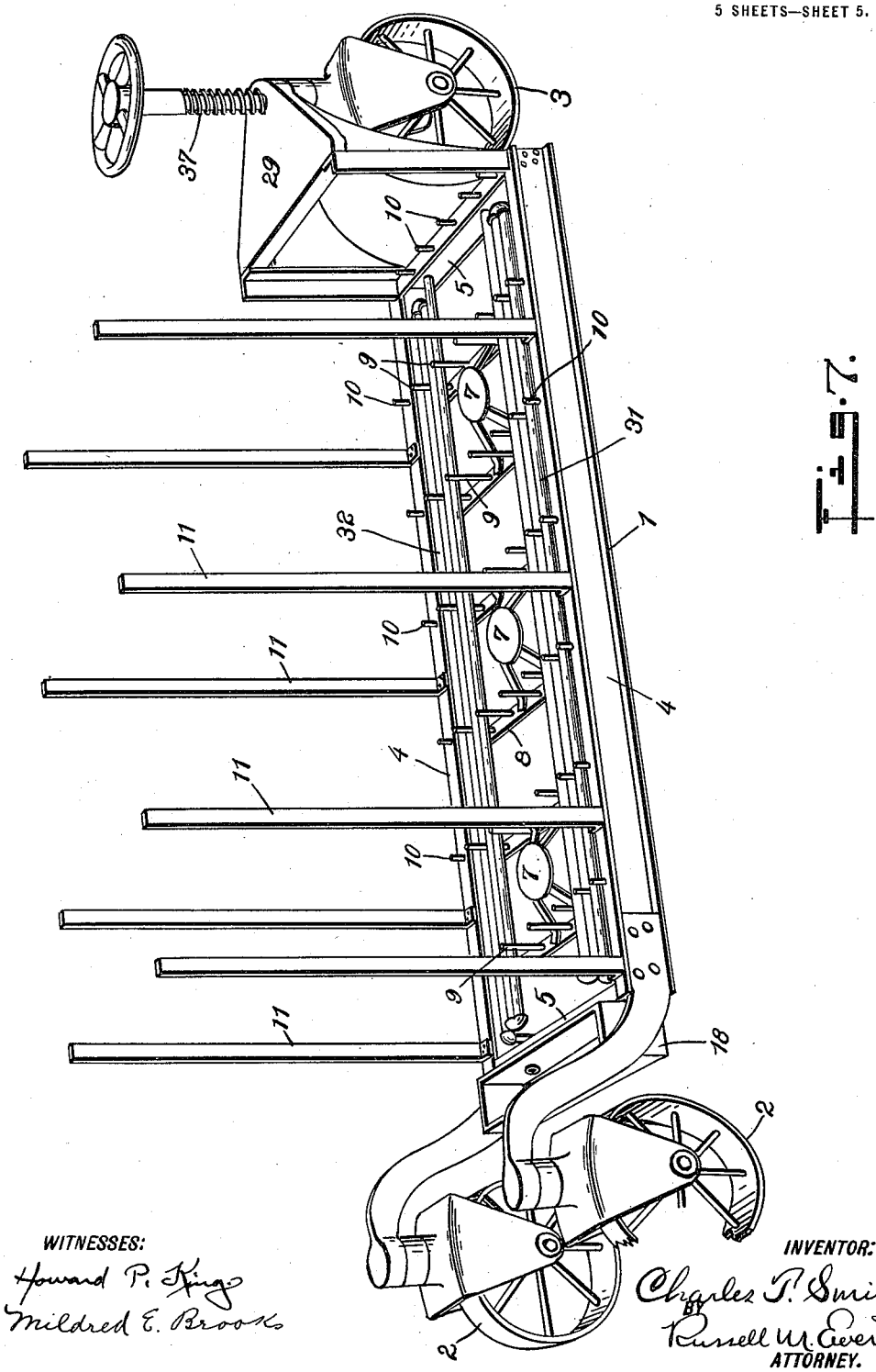

UNITED STATES PATENT OFFICE.

CHARLES T. SMITH, OF NEWARK, NEW JERSEY.

STREET-CLEANING APPARATUS FOR MELTING SNOW AND THE LIKE.

1,160,205.

Specification of Letters Patent. Patented Nov. 16, 1915.

Application filed September 15, 1914. Serial No. 861,803.

*To all whom it may concern:*

Be it known that I, CHARLES T. SMITH, a citizen of the United States, and a resident of Newark, in the county of Essex and State of New Jersey, have invented certain Improvements in Street-Cleaning Apparatus for Melting Snow and the like, of which the following is a specification.

The general purpose of this invention is to provide a portable machine which can be moved along the streets of a city or town and into which the snow, ice or the like can be shoveled and melted to clear the streets of it, the water thus formed flowing off into the sewers.

More particularly, the objects of the invention are to provide an improved and efficient apparatus for thus disposing of snow and the like; to provide a container into which the snow may be shoveled and melted with great rapidity; to apply heat to the bottom and sides of said container and admit the heat to enter within the container; to provide an extensive heat radiating surface; to confine and utilize as much heat as possible; to spray the snow in the container with a portion of the water from the melted snow; to thus utilize heat taken up in the melted snow; to increase the heat of the water used for spraying to the boiling point; to provide means for tilting the container to cause the melted snow to drain properly; to adapt the apparatus to be moved from place to place; to secure simplicity of construction and operation, and to obtain other advantages and results as may be brought out in the following description.

Referring to the accompanying drawings, in which like numerals of reference indicate the same parts throughout the several views; Figure 1 is a vertical central section taken longitudinally of a street cleaning apparatus for melting snow and the like constructed in accordance with my invention; Figs. 2 and 3 are front and rear elevations respectively; Fig. 4 is a transverse cross sectional view taken on a plane through a pair of opposite posts; Fig. 5 is a side elevation showing the shell removed; Fig. 6 is an underneath view of the apparatus; and Fig. 7 is a perspective view of the apparatus with the shell and other parts removed.

In the specific embodiment of the invention illustrated in said drawings, the reference numeral 1 indicates the chassis having rear wheels 2, 2 and a front wheel 3, preferably of the caster type or mounted upon a swivel so as to turn freely in any direction, see especially Fig. 9. The chassis may be made up of suitable channel-beams forming side sills 4, 4, and end sills 5, 5, as is customary in the art of vehicle building, and a pan or container-bottom 6 is carried by said chassis spaced far enough above the sills to allow heat to pass therebetween, see Figs. 1 and 5 especially. A plurality of burners 7 of any desired or suitable type are mounted beneath the pan, and are here shown as carried upon cross-pieces 8 secured to and extending between the side sills 4, 4, see Figs. 6 and 7. These cross-pieces furthermore carry upright pins 9 upon which the pan or bottom 6 rests, thereby affording a secure support for the pan and at the same time not interfering with the spread of the flame from the burners. Other pins 10 extending upward from the sills 4, 5 support the pan at its edges and allow the free passage of the flame and heat up around the same.

A plurality of vertically disposed studs or posts 11 are secured to the side sills 4, 4 and carry the container side walls or shell 12, which preferably comprises a rectangular member with an outer wall 13 and an inner wall 14, spaced from each other so that a heat space or chamber 15 is left between them, see Figs. 1 and 4. These two walls 13, 14 are connected at their tops, as at 16, thus closing the chamber 15 thereat and preventing the escape of the heat to the outer atmosphere. The posts 11 extend upward between the outer and inner walls 13, 14 and engage at their tops the connecting portion 16, thereby supporting said walls and the shell 12. Preferably the outer wall 13 extends downward past the gap between the pan 6 and the sills, and is spaced outwardly away from the edge of the pan so as to entrap the heat and cause the same to pass upward between the outer and inner walls of the shell, as shown at the front of the machine in Fig. 1, see also Fig. 4. Furthermore, the pan provides a peripheral flange 17 which stands up around three sides of the same to prevent escape of water, except at the rear, and the inner wall 14 of the shell hangs down inside of this flange, the said inner wall 14 obviously being of less length than the outer wall 13.

The water is allowed to escape from the container at one end of the pan, preferably the rear end, and said rear end is here shown as overlapping and resting upon the upper edge of a trough 18 extending from side to side of the apparatus at its rear. The container walls 13, 14 both terminate above the pan at this rear end of it to allow the water to flow from the pan into the said trough 18 through a space 19 thus formed, see Fig. 5. This obviously interferes with the upward passage of heat at the rear end of the machine from beneath the pan into the space between the walls 13 and 14, and so preferably flues 20 open through the bottom of the pan and extend up between said walls 13 and 14, at intervals, as shown. Also heat will pass from the portions of the chambers 15 at the sides of the shell around into the portion of said chamber at the back or rear end of the shell.

Preferably, the inner wall 14 is perforated with a plurality of holes 21 through which the heat may enter the interior chamber of the container to supplement the heat radiated from the walls, said holes being at the lower part of the shell for this purpose, as shown. As a means of increasing the radiating surface, I have shown a plurality of heat drums 22 extending upwardly within the container, opening downwardly through the pan bottom and closed at their tops. These drums may also be perforated, as at 23, thus allowing a circulation of heat from the burners up the drums and out into direct contact with snow which has been thrown into the container.

The burners preferably utilize oil as their fuel, and I have accordingly shown tanks 24 on the front and rear ends of the container from which oil may be supplied under pressure through suitable supply pipes 25.

It is a feature of the present invention to utilize a portion of the melted snow which has consumed heat from the burners, to melt more of the snow, and to this end water is taken from the trough 18 and sprayed onto the top of the snow within the container. To this end, a pipe 26 extends longitudinally of the container at its top and is provided with a plurality of spray heads 27. At one end, preferably at the front of the machine, this pipe 26 extends downwardly between the outer and inner walls 13, 14 of the container shell to a pump 28 shown mounted upon a front platform 29 and driven by a gas engine 30. A supply pipe leads from the trough 18 to the said pump, and thus as much water as needed is used from said trough, the rest overflowing into the street or being led away in any suitable manner. If desired, the heat of the water sprayed onto the snow in the container may be increased by leading the supply pipes from the trough 18 to the pump 28 through the burner flames, and I have shown said pipes comprising two coils 31, 32 connecting with the trough at its opposite ends and extending to the front of the apparatus upon opposite sides of the burners, beneath the pan, and thence upwardly between the walls 13 and 14 of the shell to the platform 29 above which they project outwardly over the platform and are joined to a single pipe 33 leading to the pump 28, see Figs. 1 and 2 more especially. Each branch is preferably provided with a valve, 34 and 35, by means of which the water supply may be obtained through either or both of the coils. Thus if the apparatus is tilted sidewise and the water stands only in one end of the trough, the coil connecting with the other end is shut off and water drawn through the coil the end of which is submerged. The water from the trough, which is somewhat warm to begin with, is by passing through the coil or coils raised to boiling temperature, so that when sprayed upon the top of the snow within the container it melts the same effectually.

Preferably, the trough 18 is provided at its rear side and near its top with nozzles 36 from which the water overflows and to which hose (not shown) can be connected to conduct the water to any desired place. Obviously it is necessary for the pan to be tilted toward its open or rear end to cause the water to flow into the trough 18, and to counteract the effect of a grade tilting the apparatus in the opposite direction, the front wheel 3 is shown for illustrative purposes swiveled upon the lower end of a vertically arranged screw 37 threaded through the front end of the platform 29. Obviously by turning said screw in the platform, the forward end of the truck may be raised, thereby tilting the pan toward the rear as desired.

In operation, the burners are lighted and regulated to supply an extensive and hot flame. Snow is thrown into the container in any suitable manner, as by shoveling, and the engine 30 operated to circulate the water from the trough 18 through the coils 32, 33, heating it to scalding temperature, and thence through the spray heads 27 onto the snow in the container. The heat from the burners not only heats the metal forming the pan but also passes upward between the inner and outer side walls of the shell of the container, heating the same to melt the snow, and also escapes into the container through the holes 21 into direct contact with the snow. Heat also passes up into the heat drums 22 and through the holes 23 therein, and with proper burners the snow will be melted substantially as fast as it can be shoveled into the container. The apparatus may be pushed from place to place and is complete within itself, the operation of the same being effected with great economy.

Obviously spray heads may be arranged at the top of the container in any other manner than the one particularly shown for purposes of illustration, and if desired, they can be otherwise placed in the container, as long as the spray therefrom will be directed against the snow for melting the same most effectually. Other detail modifications may be made in manufacturing my improved snow melting apparatus without departing from the spirit and scope of the invention, and I do not wish to be understood as limiting myself except as required by the following claims when construed in the light of the prior art.

Having thus described the invention, what I claim is.

1. The combination of a frame or chassis having pins projecting upward therefrom, a container supported on said pins and adapted to receive snow, burners on said frame or chassis beneath said container, and means for supplying fuel to said burners.

2. The combination with the sills of a frame or chassis, of cross-pieces, pins projecting upward from said sills and cross-pieces, a container seated on said pins and adapted to receive snow, and burners mounted on said cross-pieces beneath said container.

3. The combination with a frame or chassis having pins projecting upward therefrom, of a container adapted to receive snow seated on said pins, studs extending upward from the frame or chassis to prevent lateral displacement of said container, and burners on said frame or chassis beneath said container.

4. The combination with a frame or chassis, of a pan, studs extending upward from the frame or chassis upon opposite sides of said pan adapted to prevent lateral displacement thereof, a shell carried by said studs independent of said pan, and burners on said frame or chassis beneath said pan.

5. The combination with a frame or chassis, of a horizontal pan, a shell extending upward from the edges of said pan and having double walls with the space therebetween open at the bottom outside said pan, means for securing said shell and pan, and burners beneath said pan.

6. The combination with a frame or chassis, of a horizontal pan, a shell extending upward from the edges of said pan and having double walls with the space therebetween open at the bottom and outside said pan except at the rear end thereof where it is above the pan and spaced therefrom, flues extending through the pan between said double walls at its rear, and burners beneath said pan.

7. The combination with a frame or chassis, of a pan elevated above the same, a shell extending upward from the frame or chassis and having double walls with the inner one meeting the edge of said pan and the outer one depending outside the frame or chassis, and burners on said frame or chassis beneath the pan.

8. The combination with a frame or chassis, of a pan elevated above the same at its sides and one end, a shell extending upward from the chassis at said sides and end and having double walls, the inner wall at said sides and end meeting the edge of the pan and the outer wall depending at said sides and end outside the frame or chassis and both walls terminating a distance above the pan at the other end of the shell, flues extending through the pan between said double walls at said last-mentioned end of the shell, and burners beneath said pan.

9. The combination with a frame or chassis, of studs extending upward therefrom, a shell having double side walls with the space between them open at its bottom and receiving said studs, a pan at the bottom of said shell, and burners beneath said pan.

10. The combination with a frame or chassis, of a container upon said frame or chassis comprising a pan adapted to receive snow and the like and a shell at the side of said pan extending upwardly therefrom, burners beneath said pan for heating the same, and means for conveying heat above the bottom of the pan within said container and adapted to contact with snow and the like thrown into said container.

11. The combination with a frame or chassis, of a container upon said frame or chassis comprising a pan adapted to receive snow and the like and a shell at the side of said pan extending upwardly therefrom, burners beneath said pan for heating the same, and heat drums projecting upwardly within said container open at their bottoms through the pan for conveying heat above the bottom of the pan within said container and adapted to contact with snow and the like thrown into said container.

12. The combination with a frame or chassis, of a container upon said frame or chassis comprising a pan adapted to receive snow and the like and a shell at the side of said pan extending upwardly therefrom burners beneath said pan for heating the same, and heat drums projecting upwardly within said container having their upper ends closed to the down passage of snow or the like thrown into the container and having their lower ends opening through the pan for conveying heat above the bottom of the pan within said container and adapted to contact with snow and the like thrown into said container.

13. The combination with a frame or chassis, of a container upon said frame or chassis comprising a pan adapted to receive snow and the like and a shell at the side of said pan extending upwardly therefrom, burners beneath said pan for heating the same, and heat drums projecting upwardly within said container in communication through the pan with the heat from said burners, and having perforations above said pan within the container for conveying heat above the bottom of the pan within the container.

14. The combination with a container adapted to receive snow at its top, and means for applying heat to said container at its bottom, of a trough at one end of said container adapted to receive water therefrom, pipes leading from opposite ends of said trough along opposite sides of said container beneath the same, a pump connected to said pipes, a discharge pipe in the top of the container having a spraying head, and means beneath said container for heating both it and the said pipes therebeneath.

15. The combination with a container adapted to receive snow, of a trough at one end of said container adapted to receive water therefrom, pipe coils leading from opposite ends of said trough along opposite sides of said container, a pump connected to said pipes, a discharge pipe leading from said pump to the upper part of said container, and means beneath said container for heating both it and the said pipe coils.

16. The combination with a container adapted to receive snow and having double side walls, of a pipe adapted to receive a portion of the water discharged at one end of said container and extending along the bottom of the same to the other end upward between the double walls thereat and discharging into the top of the container, means for forcing water through said pipe, and means beneath said container for heating the same and said pipe and the space between said double walls.

17. The combination of a shell having double walls the outer one of which is longer than the inner one on three sides of the shell, a pan meeting the lower edge of the inner wall on said three sides of the shell, and extending beneath the wall at the other side in spaced relation thereto, flues extending through said pan into the space of the double wall at said last-mentioned side, perforated drums extending upward from said pan, the inner wall of the shell being also perforated for its lower portion, and burners beneath said pan adapted to supply heat to said drums and space between the double walls of the container.

CHARLES T. SMITH.

Witnesses:
HOWARD P. KING,
JANET A. AYERS.

Copies of this patent may be obtained for five cents each, by addressing the "Commissioner of Patents, Washington, D. C."